United States Patent
Iwamura et al.

(10) Patent No.: US 11,041,741 B2
(45) Date of Patent: Jun. 22, 2021

(54) OPTICAL FIBER SENSOR DEVICE AND OPTICAL FIBER SENSOR SYSTEM

(71) Applicant: Oki Electric Industry Co., Ltd., Tokyo (JP)

(72) Inventors: Hideyuki Iwamura, Tokyo (JP); Tokuo Yamaguchi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 16/549,812

(22) Filed: Aug. 23, 2019

(65) Prior Publication Data

US 2020/0103258 A1 Apr. 2, 2020

(30) Foreign Application Priority Data

Sep. 27, 2018 (JP) .............................. JP2018-181904

(51) Int. Cl.
| | |
|---|---|
| *G01D 5/353* | (2006.01) |
| *G01M 11/08* | (2006.01) |
| *G01L 1/24* | (2006.01) |
| *G01K 11/32* | (2021.01) |
| *G01K 3/06* | (2006.01) |
| *G01K 11/3206* | (2021.01) |
| *G01M 11/00* | (2006.01) |

(52) U.S. Cl.
CPC ....... *G01D 5/35358* (2013.01); *G01D 5/3537* (2013.01); *G01D 5/35364* (2013.01); *G01D 5/35374* (2013.01); *G01K 3/06* (2013.01); *G01K 11/32* (2013.01); *G01K 11/3206* (2013.01); *G01M 11/085* (2013.01); *G01M 11/3109* (2013.01); *G01L 1/242* (2013.01)

(58) Field of Classification Search
None
See application file for complete search history.

(56) References Cited

U.S. PATENT DOCUMENTS

| | | | | |
|---|---|---|---|---|
| 5,451,772 A | * | 9/1995 | Narendran | G01D 5/35383 250/227.19 |
| 5,698,848 A | * | 12/1997 | Belk | G01D 5/35383 250/227.11 |
| 2013/0188168 A1 | * | 7/2013 | Hartog | E21B 47/113 356/32 |

OTHER PUBLICATIONS

K.Koizumi, et al, "High-Speed Distributed Strain Measurement using Brillouin Optical Time-Domain Reflectometry Based-on Self-Delayed Heterodyne Detection", ECOC2015, p. 1.07, Sep. 2015.

* cited by examiner

*Primary Examiner* — Michelle R Connelly
(74) *Attorney, Agent, or Firm* — Rabin & Berdo, P.C.

(57) ABSTRACT

An optical fiber sensor device includes a control section configured to compute a physical quantity in an optical fiber installed at plural measurement locations based on intensity of scattered light received, and to compute an average of the computed physical quantity for the optical fiber. The control section is configured to compute the average of the physical quantity based on the computed physical quantity and on a length of the optical fiber. A length of the optical fiber installed at the measurement location is increased as a distance between a light source and the respective measurement location increases.

10 Claims, 7 Drawing Sheets

FIG.3
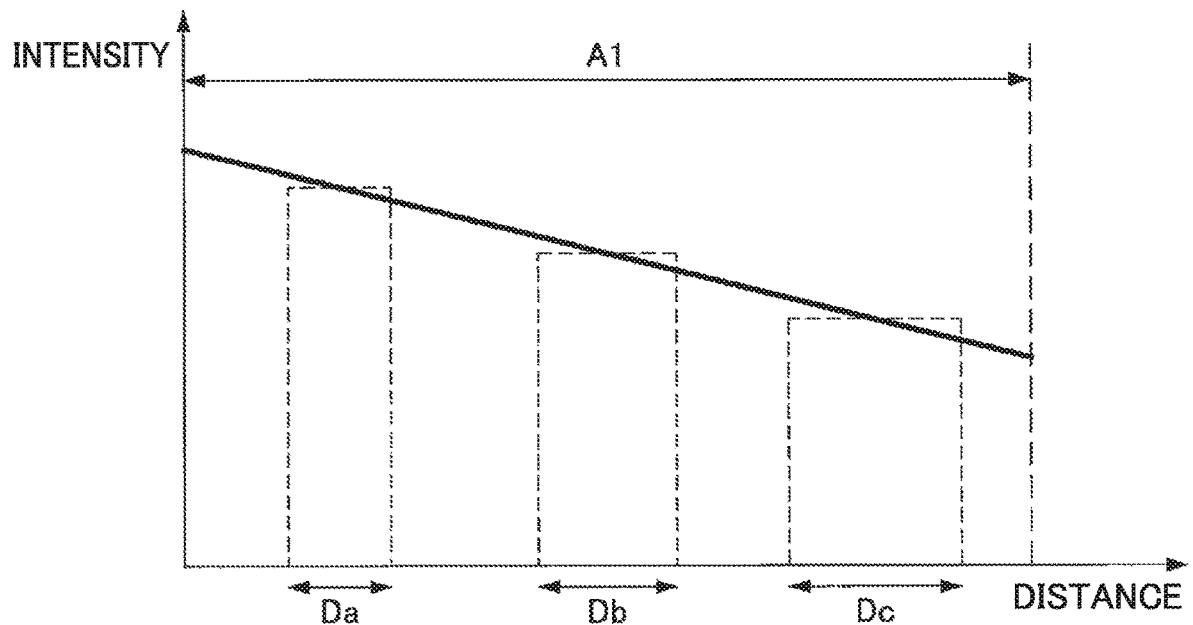
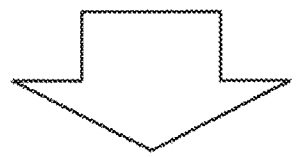
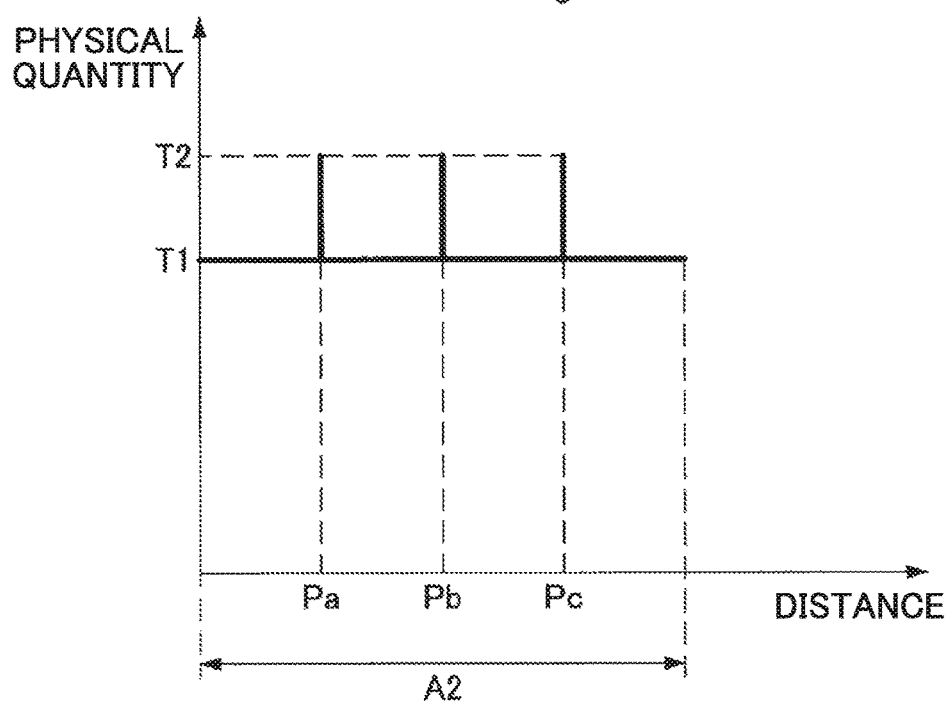

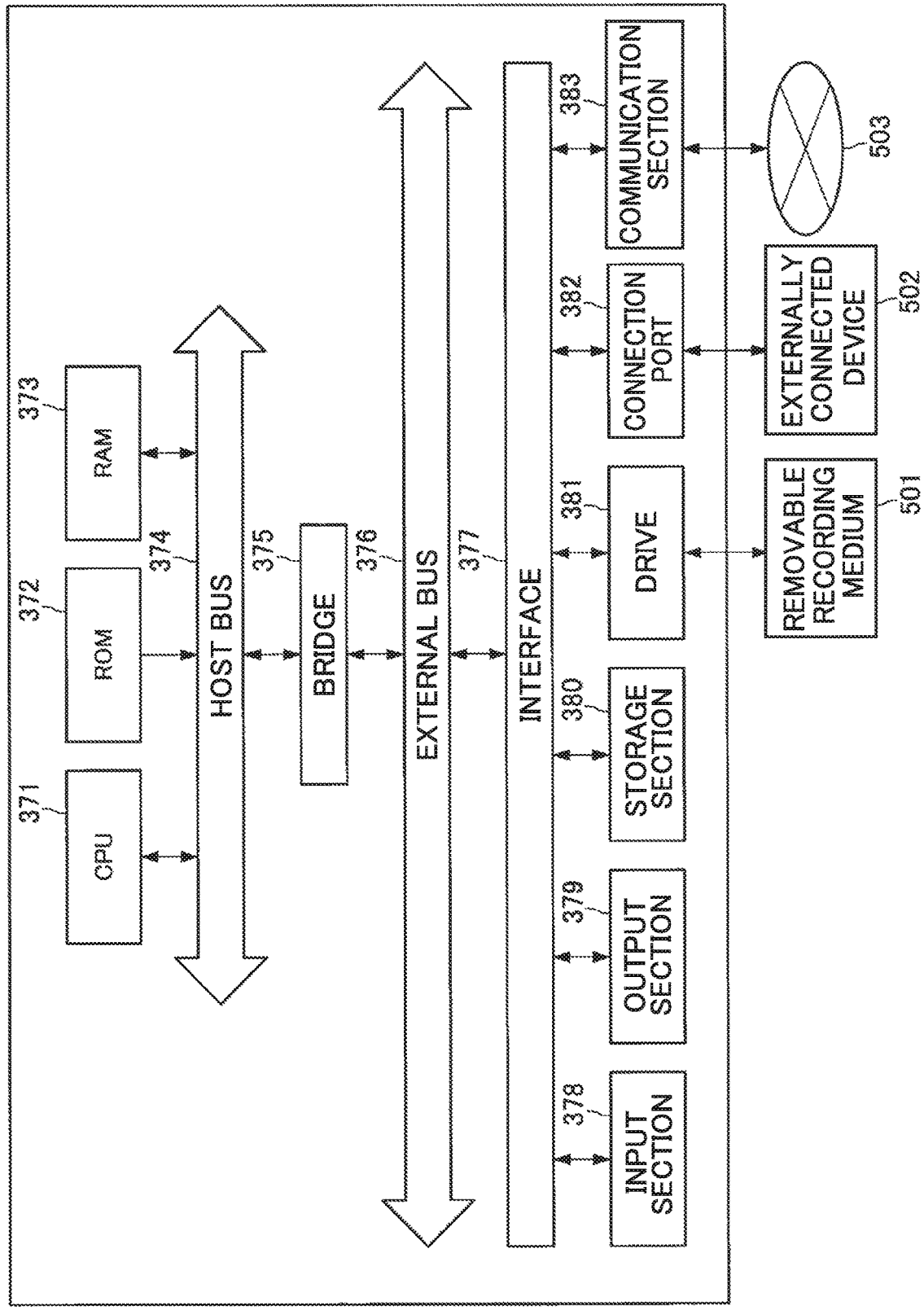

_US 11,041,741 B2_

OPTICAL FIBER SENSOR DEVICE AND OPTICAL FIBER SENSOR SYSTEM

CROSS-REFERENCE TO RELATED APPLICATION

This application is based on and claims priority under 35 USC 119 from Japanese Patent Application No. 2018-181904 filed on Sep. 27, 2018 the disclosure of which is incorporated by reference herein.

TECHNICAL FIELD

The present disclosure relates to an optical fiber sensor device and an optical fiber sensor system.

RELATED ART

Recent years have seen the development of technology in which optical fibers are employed in sensing. Optical fiber sensors employed in such sensing differ from traditional electrical sensors in that the sensor section thereof does not require a power source. Such optical fiber sensors are thus well-suited to deployment in locations where power supply would be difficult, such as within sealed devices.

Distributed optical fiber sensing is a type of optical fiber sensing in which an optical fiber can perform measurements along its length direction, and in which the optical fiber itself also serves as a sensor medium. For example, K. Koizumi, et al, "High-Speed Distributed Strain Measurement using Brillouin Optical Time-Domain Reflectometry Based-On Self-Delayed Heterodyne Detection", ECOC2015, P.1.07, September 2015 (Non-Patent Document 1), discloses technology relating to distributed optical fiber sensing.

In distributed optical fiber sensing, when there is an arrangement of plural measurement locations, the distance from a light source differs at each of the measurement locations, and therefore the light transmission loss also differs with each distance. The difference in transmission loss to the measurement locations causes differences to appear in the intensity of scattered light received by an optical fiber sensor device. Reception sensitivities at the plural measurement locations do not accordingly match each other, with difficulties anticipated when comparing the measurement results from the plural measurement locations.

In order to perform comparison of the measurement results from plural measurement locations, there is accordingly a desire to make the reception sensitivities at the plural measurement locations substantially the same as each other.

SUMMARY

In consideration of the above circumstances, an object of the present disclosure is to provide a novel and improved optical fiber sensor device and optical fiber sensor system that are capable of making reception sensitivities at plural measurement locations substantially the same as each other, thereby facilitating comparison of measurement results at the plural measurement locations.

In order to solve the above issues, an aspect of the present disclosure provides an optical fiber sensor device including a control section configured to compute a physical quantity in an optical fiber installed at plural measurement locations based on intensity of scattered light received, and to compute an average of the computed physical quantity for the optical fiber. The control section is configured to compute the average of the physical quantity based on the computed physical quantity and on a length of the optical fiber. A length of the optical fiber installed at the respective measurement location is increased as a distance between a light source and the respective measurement location increases.

The control section may also be configured to compensate for a difference in length of the optical fiber installed at the respective measurement location and to compute the average of the physical quantity at the compensated length.

The control section may also be configured to compute the physical quantity in the optical fiber installed at the plural measurement locations as the physical quantity for substantially the same length.

The optical fiber may be installed so as to link the plural measurement locations together in a row. The control section may be configured to compute the physical quantity in the optical fiber installed as the row link, and to compute an average of the computed physical quantity of the optical fiber installed as the row link.

The control section may employ Brillouin optical time domain reflectometry (BOTDR) to compute the physical quantity in the optical fiber and to compute the average of the physical quantity.

In order to solve the above issues, another aspect of the present disclosure provides an optical fiber sensor system including a light source section, an optical fiber, a light reception section, and a control section. The light source section employs a light source to generate input light. The optical fiber is installed at plural measurement locations and is configured to scatter the input light to generate scattered light. The light reception section is configured to receive the scattered light generated inside the optical fiber. The control section is configured to compute a physical quantity in the optical fiber based on intensity of the scattered light received, and to compute an average of the computed physical quantity for the optical fiber. The control section is also configured to compute the average of the physical quantity based on the computed physical quantity and on a length of the optical fiber. The length of the optical fiber installed at the respective measurement location is increased as a distance between the light source and the respective measurement location increases.

As described above, the present disclosure provides a novel and improved optical fiber sensor device and optical fiber sensor system that are capable of making the reception sensitivities at plural measurement locations substantially the same as each other, thereby facilitating comparison of measurement results at the plural measurement locations.

BRIEF DESCRIPTION OF DRAWINGS

FIG. 3 is a diagram to explain processing to compute a physical quantity from the intensity of scattered light received according to the same exemplary embodiment.

FIG. 7 is a block diagram illustrating an example of a hardware configuration for configuration according to an exemplary embodiment of the present disclosure.

DETAILED DESCRIPTION

Figure 1:
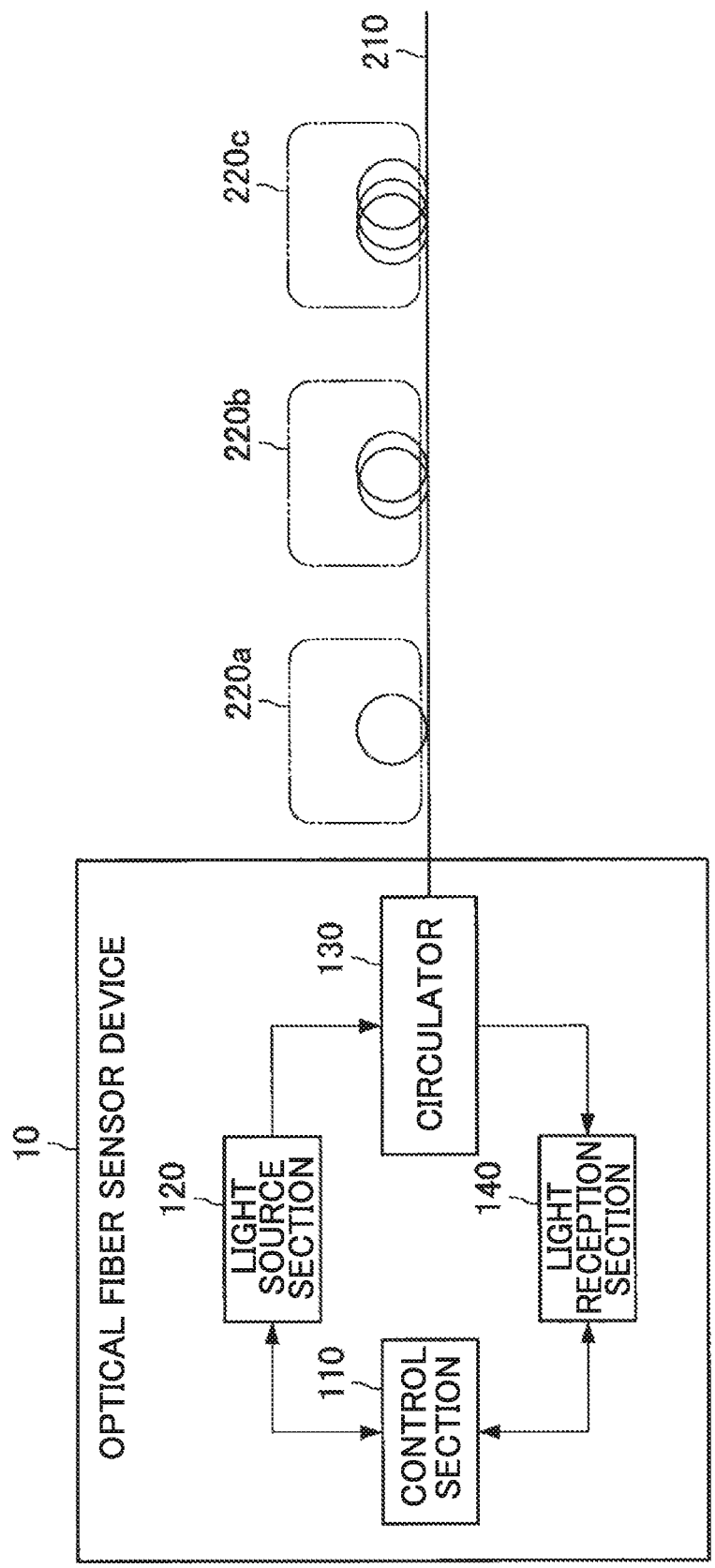
FIG. 1 is a block diagram illustrating an example of configuration of an optical fiber sensor system according to an exemplary embodiment of the present disclosure.

Detailed explanation follows regarding preferable exemplary embodiments of the present disclosure, with reference to the appended drawings. In the present specification and in the drawings, configuration elements having effectively the same functional configuration as each other are allocated the same reference numerals and duplicate explanation is accordingly omitted.

1. FIRST EXEMPLARY EMBODIMENT 1-1 Overview

First, explanation will be given regarding an overview of the present disclosure.

Recent years have seen the development of technology relating to optical fiber sensors that perform sensing using an optical fiber as a sensor medium. Advantages of optical fiber sensors over battery-operated sensors include not requiring a power supply and having a smaller diameter and lighter weight etc. Employing optical fiber sensors also enables a sensor section installed to an object to be measured to be spaced apart from parts of the configuration where the light source and light receiver are provided. Sensing with an optical fiber sensor is thus expected to be applicable to monitoring infrastructure such as buildings.

Types of optical fiber sensors include distributed optical fiber sensors in which an optical fiber is itself employed as a sensing medium in the sensor section. Employing distributed optical fiber sensors enables measurement of the distribution of a physical quantity along the length direction of the optical fiber. Examples of such a physical quantity include temperature and strain.

For example, distributed optical fiber sensors employ optical time domain reflectometry (OTDR). In OTDR, the optical fiber sensor device emits pulses of light into the optical fiber, and receives backscattered light generated inside the optical fiber. The location in the optical fiber where scattering occurred is determined by measuring the time taken from when the optical fiber sensor device emitted the pulse of light, to when the backscattered light is received by the optical fiber sensor device. Namely, when employing OTDR, it is possible to measure the distribution of a physical quantity along the length direction of the optical fiber. Temperature, amount of strain etc. can be computed based on the amount of change in intensity and the amount of change in the frequency of the backscattered light received.

A connection is made between two measurement locations using an optical fiber. The greater the distance between the optical fiber sensor device and the measurement location, the more transmission loss occurs in the intensity of the scattered light. Namely, differences in reception sensitivity arise between the sensor sections at the respective measurement locations. Such differences are anticipated to cause difficulties when comparing measurement results from plural measurement locations.

The technical concept of an exemplary embodiment of the present disclosure was arrived at in consideration of the point described above, and has the following features. A control section is provided configured to compute a physical quantity in an optical fiber installed at plural measurement locations based on intensity of scattered light received, and to compute an average of the computed physical quantity for the optical fiber. The control section is configured to compute the average of the physical quantity based on the computed physical quantity and on a length of the optical fiber. A length of the optical fiber installed at the respective measurement location is increased as a distance between a light source and the respective measurement location increases.

These features make reception sensitivity substantially the same between plural measurement locations, thereby enabling easy comparison of measurement results from these plural measurement locations.

Explanation follows regarding an example of distributed optical fiber sensing.

1-2. Example Configuration

First, explanation follows regarding an example of a configuration of an optical fiber sensor system according to an exemplary embodiment of the present disclosure. FIG. 1 is a block diagram illustrating an example of a configuration of an optical fiber sensor system according to an exemplary embodiment of the present disclosure. This optical fiber sensor system includes an optical fiber sensor device 10, an optical fiber 210, and measurement locations 220. Note that measurement locations 220a, 220b, and 220c are disposed so as to be arranged along the optical fiber 210.

Optical Fiber Sensor Device 10

The optical fiber sensor device 10 according to the present exemplary embodiment is a measurement device capable of measuring a physical quantity at the measurement locations 220 using the optical fiber 210. Examples of the physical quantity include the temperature and strain etc. at the measurement locations 220.

The optical fiber sensor device 10 includes a control section 110, a light source section 120, a circulator 130, and a light reception section 140.

Control Section 110

The control section 110 according to the present exemplary embodiment has a function of performing calculations regarding the physical quantity at the measurement locations 220a to 220c based on the intensity of scattered light waves received by the light reception section 140. Specifically, the control section 110 measures the physical quantity along the length direction of the optical fiber 210 based on the scattered light received, and computes an average of the physical quantity in the optical fiber 210 installed at the plural measurement locations 220a to 220c. The control section 110 also has a function of controlling the light source section 120 and the light reception section 140. The control section 110 may be configured as a CPU, a general purpose or a special purpose processor or other types of processing circuitry.

Light Source Section 120

The light source section 120 according to the present exemplary embodiment has a function of generating input light to be introduced into the optical fiber 210. Note that the light source section 120 introduces the input light into the optical fiber 210 through the circulator 130, described later. The input light may, for example, be configured by pulses of light. Pulses of light can be particularly effective as the input light when making time-resolved measurements of the physical quantity. The light source section 120 may include an optical divider, with the optical divider being employed to generate reference light when the input light is being generated.

The light source section 120 includes, for example, a semiconductor laser (laser diode) and an electro-optic modulator.

Circulator 130

The circulator 130 according to the present exemplary embodiment is an optical divider that takes the input light input from the light source section 120 and emits this light toward the optical fiber 210, and takes scattered light input from the optical fiber 210 and emits this light toward the light reception section 140.

Light Reception Section 140

The light reception section 140 according to the present exemplary embodiment has a function of receiving scattered light generated inside the optical fiber 210. The light reception section 140 receives the scattered light via the circulator 130.

The light reception section 140 includes, for example, a balanced detector (balanced photodiode), and an electrical spectrum analyzer, or other type of circuitry or device configured to receive light and measure intensity of the received light.

Optical Fiber 210

The optical fiber 210 according to the present exemplary embodiment is employed when the optical fiber sensor device 10 measures the physical quantity at the respective measurement locations 220a to 220c. The optical fiber 210 may be installed so as to connect the optical fiber sensor device 10 and the respective measurement locations 220a to 220c together in a row. The scattered light generated at segments of the optical fiber installed at the respective measurement locations 220a to 220c changes according to the physical quantity at the respective measurement locations 220a to 220c.

Installation may be performed such that a length of the optical fiber installed at each of the respective measurement locations 220a to 220c is increased as the distance between the optical fiber sensor device 10 and the respective measurement locations 220a to 220c increases.

Measurement Locations 220

The measurement locations 220a to 220c according to the present exemplary embodiment are locations where the physical quantity is measured. The measurement locations 220a to 220c are each installed with a segment of the optical fiber 210. The measurement locations 220a to 220c may be specific devices or may be spaces. For example, in cases in which the measurement locations 220 are specific devices, the optical fiber 210 may be wound around the measurement locations 220. The manner in which the segments of the optical fiber 210 are installed at the measurement locations 220 is not limited to the above example.

Explanation has been given regarding an example of a configuration of the optical fiber sensor system according to the present exemplary embodiment. Note that the configuration described with reference to FIG. 1 is merely an example, and the functional configuration of the optical fiber sensor system according to the present exemplary embodiment is not limited to this example. The functional configuration of the optical fiber sensor system according to the present exemplary embodiment may be freely modified according to specification and application. For example, configuration other than the control section 110 may be provided independently so as to reside in a separate device from the optical fiber sensor device 10, such as in a configuration in which, for example, the control section 110 controls other configuration over a network.

1-2. Example of Operation

Explanation follows regarding an example of processing in the optical fiber sensor system according to the present exemplary embodiment. Note that as an example, in the following explanation the optical fiber sensor performs distributed measurement capable of continuous measurements along the optical fiber.

Figure 2:
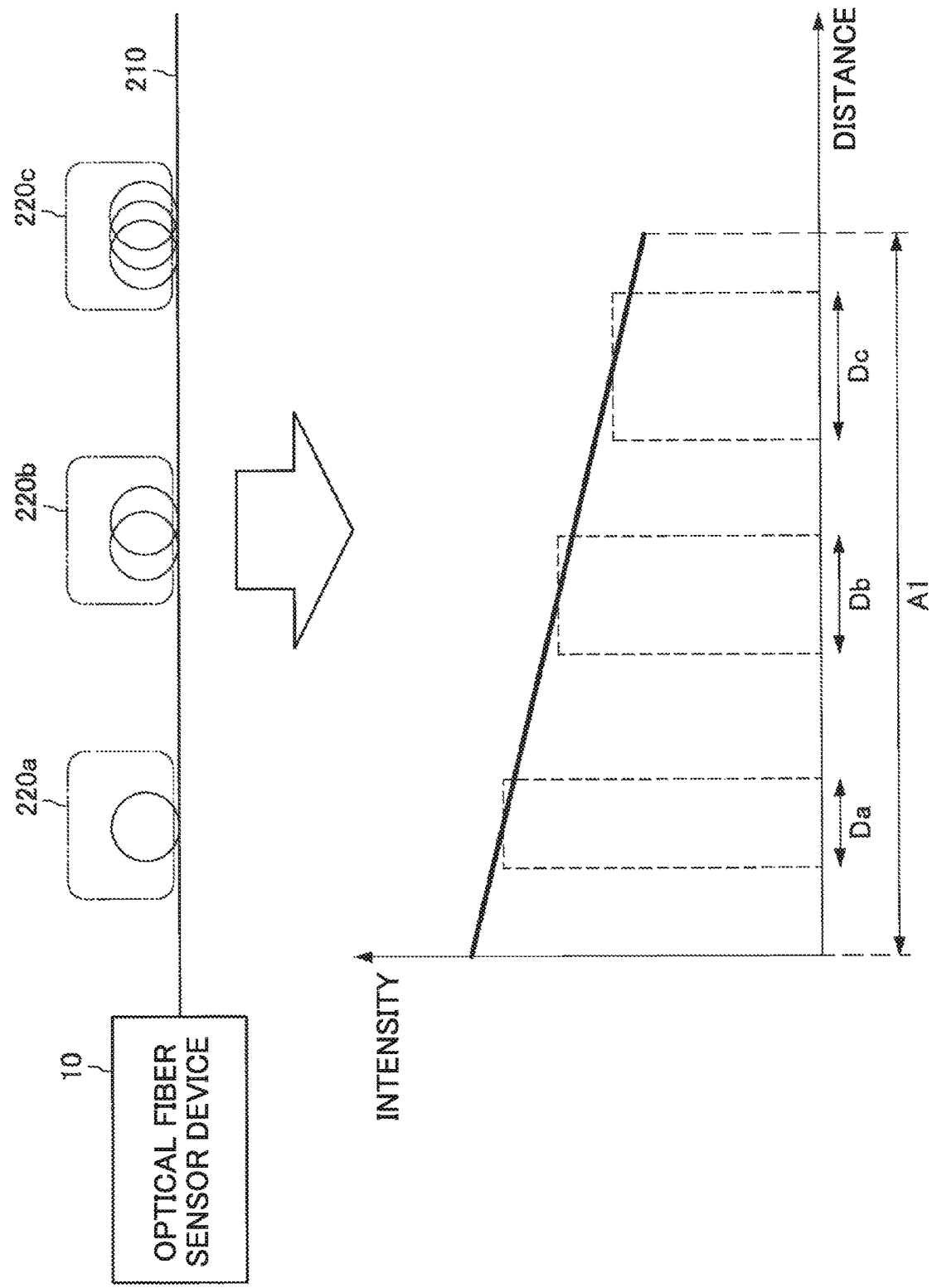
FIG. 2 is a diagram to explain intensity of scattered light received from an optical fiber 210.

First, explanation follows regarding the intensity of the scattered light received from the optical fiber 210. FIG. 2 is a diagram to explain the intensity of the scattered light received from the optical fiber 210. The optical fiber sensor device 10, the optical fiber 210, and the measurement locations 220a to 220c are illustrated at the top of FIG. 2. As illustrated at the top of FIG. 2, there is surplus length for the optical fiber 210 installed at the measurement locations 220a to 220c.

The intensity of the scattered light from the optical fiber 210 is illustrated against distance from the optical fiber sensor device 10 at the bottom of FIG. 2. Note that A1 represents the total length of the optical fiber 210, the measurement length Da represents the length of the surplus length of optical fiber installed at the measurement location 220a, the measurement length Db represents the length of the surplus length of optical fiber installed at the measurement location 220b, and the measurement length Dc represents the length of the surplus length of optical fiber installed at the measurement location 220c.

The greater the distance from the optical fiber sensor device 10, the greater the transmission distance of the input light and the scattered light through the optical fiber 210. This results in a decrease in the intensity of the scattered light from the optical fiber 210 received by the light reception section 140. As illustrated at the bottom of FIG. 2, the distance of the measurement length D is increased as the distance from the optical fiber sensor device 10 increases. In the example of FIG. 2, since the distance from the optical fiber sensor device 10 increases in sequence through the measurement locations 220a, 220b, 220c, the measurement lengths D are also increased in the sequence of the measurement lengths Da, Db, Dc.

The light reception section 140 then computes the physical quantity from the intensity of the scattered light received. The method for computing the physical quantity depends on the type of physical quantity and conditions at the measurement locations 220. FIG. 3 is a diagram to explain processing to compute the physical quantity from the intensity of the scattered light received in the first exemplary embodiment. The intensity of the scattered light from the optical fiber 210 against distance from the optical fiber sensor device 10 is illustrated at the top of FIG. 3. The computed physical quantity against the distance from the optical fiber sensor device 10 is illustrated at the bottom of FIG. 3.

The control section 110 computes a specific type of physical quantity from the intensity of the scattered light. The control section 110 computes from the computed physical quantity an average of the physical quantity at each of the optical fiber measurement lengths Da to Dc installed at the respective measurement locations 220a to 220c. When computing these averages, a unit distance is made to be the same between the respective measurement locations 220a to 220c. The control section 110 computes the physical quantity against distance from the optical fiber sensor device 10 as the physical quantity for the same length at each of the measurement lengths Da to Dc.

In the case of the example illustrated at the bottom of FIG. 3, the control section 110 computes the physical quantity at the measurement lengths Da to Dc by computing as the physical quantity at measurement points Pa to Pc. As illustrated at the bottom of FIG. 3, the control section 110 computes an average of the physical quantity for each of the measurement lengths Da to Dc as the physical quantity for the measurement points Pa to Pc. As illustrated at the bottom of FIG. 3, the measurement points Pa to Pc are each treated as a single point. The control section 110 thereby computes the average of the physical quantity so as to compensate for the differences between the lengths of the respective measurement lengths Da to Dc. Note that a length A2 is a length obtained by subtracting the lengths of segments of the optical fiber 210 at the measurement locations 220a to 220c from the total length A1 of the optical fiber 210. In the example at the bottom of FIG. 3, the measurement points Pa to Pc are each illustrated as a single point. However, the physical quantity does not necessarily have to be computed for a single point at the measurement lengths Da to Dc using compensation by the control section 110. The control section 110 may compensate the measurement lengths Da to Dc to substantially the same length as each other. The control section 110 achieves compensation so as to enable the measurement results from the measurement locations 220a to 220c to be compared with each other.

As described above, installation is performed so as to increase the length of the optical fiber installed at each of the measurement locations 220a to 220c as the distance between the optical fiber sensor device 10 and the respective measurement location 220a to 220c increases. Namely, the length of the measurement length D is made longer as the distance from the optical fiber sensor device 10 increases. Accordingly, by the control section 110 computing an average as the physical quantity for the measurement points Pa to Pc, the total intensity of the scattered light is substantially the same at the measurement locations 220a to 220c, i.e. the reception sensitivities are substantially the same as each other at the measurement locations 220a to 220c.

This functionality enables the reception sensitivities to be made substantially the same at the plural measurement locations.

Note that the graphs illustrated in FIG. 2 and FIG. 3 are merely examples, and there is no limitation to these examples. The functionality described above is applicable even for conditions of transmission loss different to those in the examples at the bottom of FIG. 2 or at the top of FIG. 3. The average physical quantity computed by the control section 110 as illustrated at the bottom of FIG. 3 may also differ according to changes in the conditions of transmission loss. The processing described above may also be implemented using Brillouin optical time domain reflectometry (BOTDR).

Figure 4:
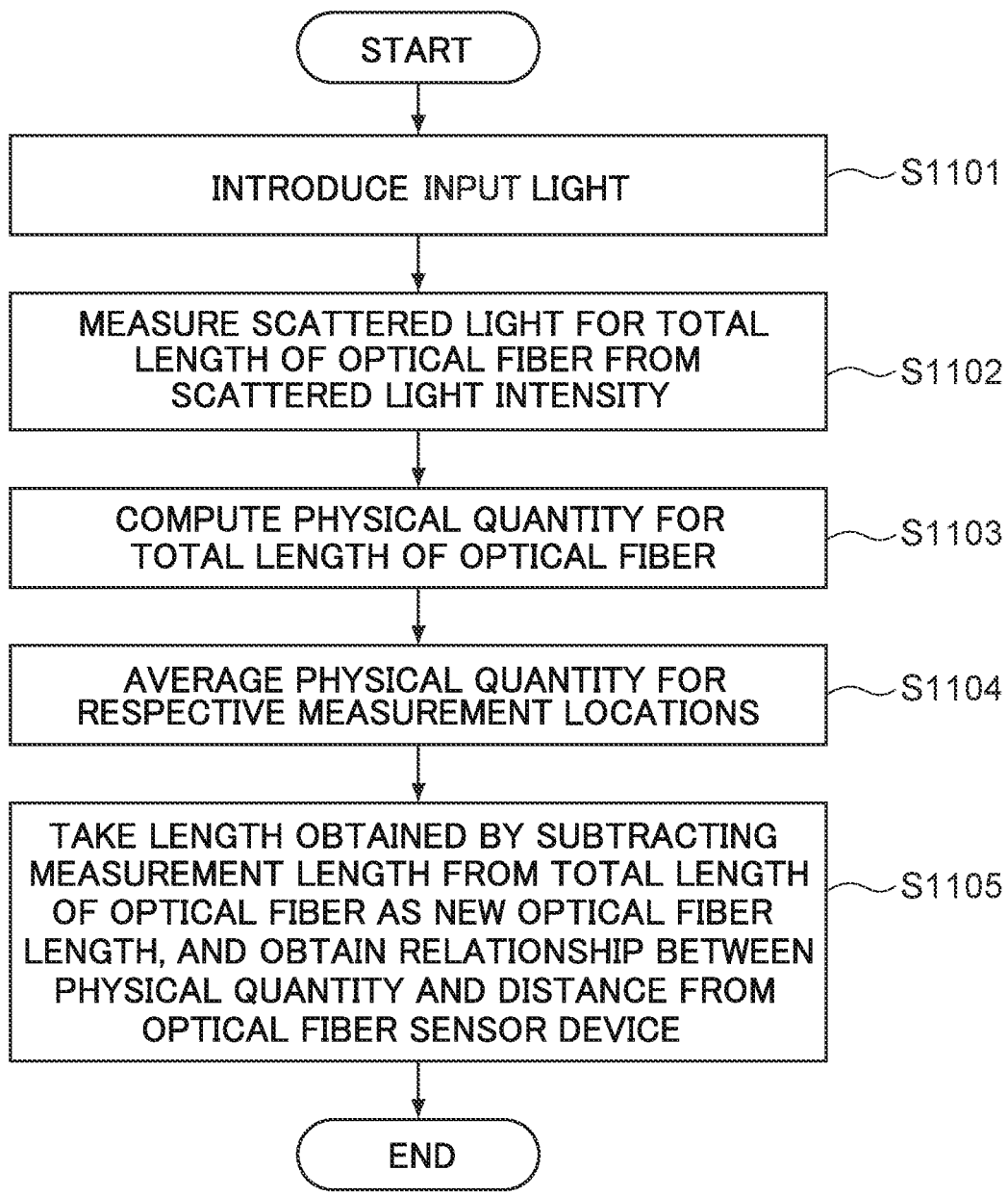
FIG. 4 is a diagram to explain an example of a flow of operation to compute an average of a physical quantity using an optical fiber sensor system according to the same exemplary embodiment.

Explanation follows regarding a flow of operation when computing the averages for the physical quantity in the optical fiber sensor system. FIG. 4 is a diagram to explain an example of a flow of operation of the optical fiber sensor system according to the first exemplary embodiment, as far as computation of the average physical quantity.

Refer now to FIG. 4. The light source section 120 first introduces the input light into the optical fiber 210 via the circulator 130 (S1101). The light reception section 140 then measures intensity of the scattered light generated inside the optical fiber 210, after the scattered light has passed through the circulator 130 (S1102). The control section 110 then computes a physical quantity for the total length A1 of the optical fiber 210 from the intensity of the scattered light measured at step S1102 (S1103). The control section 110 then averages the physical quantity for each of the measurement lengths D using the physical quantity computed at step S1103 (S1104). Finally, taking the length A2 obtained by subtracting the measurement lengths D from the total length A1 of the optical fiber 210 as a new optical fiber length, the control section 110 obtains a relationship of the physical quantity to the distance from the optical fiber sensor device 10 (S1105), and ends operation of the optical fiber sensor system.

2. SECOND EXEMPLARY EMBODIMENT

Explanation has been given regarding a first exemplary embodiment of the present disclosure. Next, explanation follows regarding a second exemplary embodiment of the present disclosure. Duplicate content to that described in the first exemplary embodiment will be omitted, with explanation focusing on differences to the first exemplary embodiment. Explanation follows regarding an example employing Brillouin optical time-domain reflectometry (BOTDR), this being sensing technology for measuring frequency spectra of Brillouin-scattered light.

In the second exemplary embodiment, the amounts of a moisture-sensitive material provided on an outer peripheral face of the optical fiber at measurement locations are adjusted so as to make reception sensitivities at plural measurement locations substantially the same as each other, thereby facilitating comparison of measurement results at the plural measurement locations.

Figure 5:
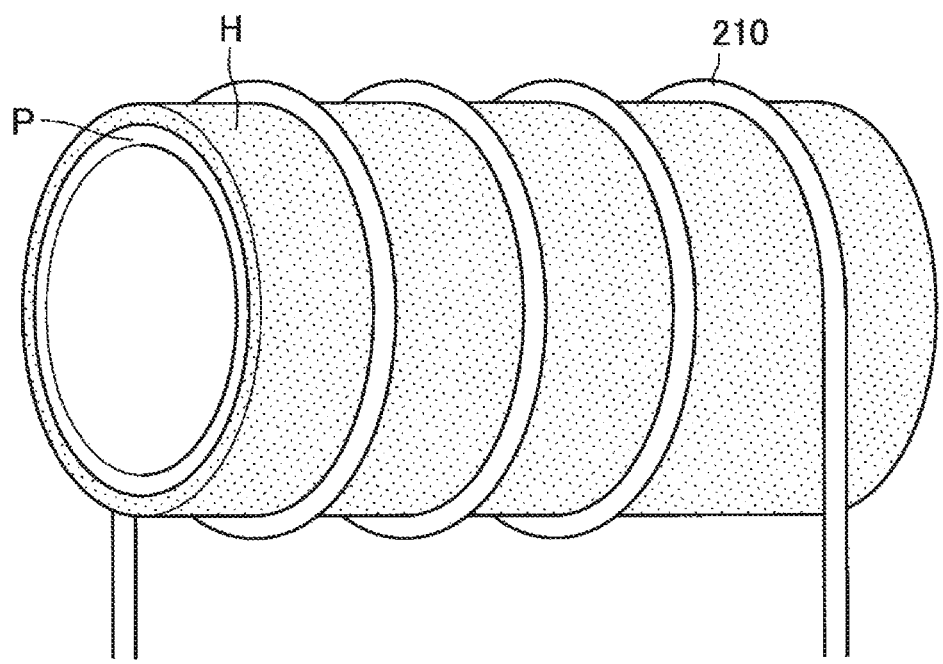
FIG. 5 is a diagram to explain an example of a measurement location 220 according to a second exemplary embodiment.

FIG. 5 is a diagram to explain an example of the measurement locations 220 according to the second exemplary embodiment. FIG. 5 illustrates a hollow pipe P, a moisture-sensitive material H, and a segment of an optical fiber 210. The moisture-sensitive material H is wound around a circular columnar face of the hollow pipe P. The moisture-sensitive material H is a substance that expands as humidity rises. The expansion ratio of the moisture-sensitive material H is determined by the humidity expansion coefficient specific to the moisture-sensitive material H.

The optical fiber sensor in FIG. 5 is capable of measuring the value of strain in response to humidity. The following is a specific explanation thereof. First, the moisture-sensitive material H expands as humidity rises. The optical fiber 210 wound around the moisture-sensitive material H is applied with pressure when the moisture-sensitive material H expands, generating strain. Namely, the optical fiber sensor device 10 is able to measure humidity indirectly by employing the moisture-sensitive material H.

For a certain size of hollow pipe P, an increase in the volume of the moisture-sensitive material H provided to the circular columnar face of the hollow pipe P will, for example, generally result in a larger increase in the volume of the moisture-sensitive material H for the same rise in humidity. This larger increase in volume causes a greater increase in the value of strain in the optical fiber 210. Increasing the volume of the moisture-sensitive material H will accordingly increase the value of strain in a segment of the optical fiber 210 for the same rise in humidity. For example, when employing BOTDR in an optical fiber sensor system, since a shift in the frequency of Brillouin scattering caused by strain is measured, the fiber sensor sensitivity is raised by increasing the value of strain in the optical fiber 210 for the same rise in humidity.

The shape of the hollow pipe P does not have to be a circular columnar body as illustrated in FIG. 5, and the hollow pipe P may be cuboidal, for example. Moreover, configuration may employ the moisture-sensitive material H alone, without using a hollow pipe P.

Figure 6:
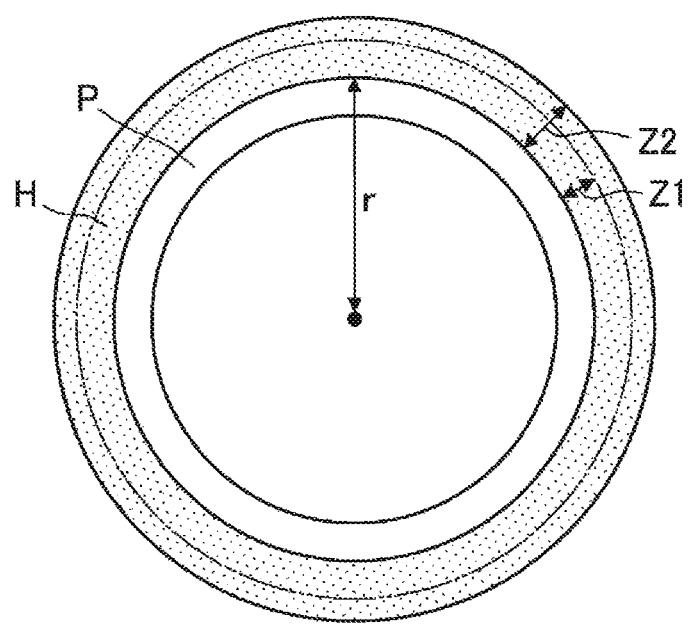
FIG. 6 is a diagram to explain an example of a method to compute a compensated amount for a moisture-sensitive material H according to the same exemplary embodiment.

Explanation follows regarding adjustment of the amount of coating of the moisture-sensitive material H, with reference to an example in which the moisture-sensitive material H is coated onto a circular columnar face of a circular columnar body. FIG. 6 is a diagram to explain an example of a method for computing a compensated amount for the moisture-sensitive material H according to the second exemplary embodiment. FIG. 6 illustrates a cross-section of the circular columnar body illustrated in FIG. 5. FIG. 6 illustrates the hollow pipe P and the moisture-sensitive material H.

In FIG. 6, the radius of the hollow pipe P is denoted r (m). The humidity expansion coefficient of the moisture-sensitive material H is denoted X (ppm/% RH), and the thickness of the moisture-sensitive material H prior to a rise in humidity is denoted Z1 (m). Thus, the outer circumference prior to a rise in humidity is $2\pi$ (r+Z1) (m).

The thickness Z2 (m) of the moisture-sensitive material H after the rise in humidity is given under the above conditions by Z2=Z1 (1+XY), wherein Y (%) is the humidity rise. The proportional strain c induced thereby is computed using the following Equation (1).

$$\varepsilon = \frac{2\pi(r+Z2)}{2\pi(r+Z1)} \quad (1)$$
$$= \frac{r+Z1(1+X*Y)}{r+Z1}$$

Namely, the relationship between the proportional strain c and the rise in humidity Y is determined by setting the humidity expansion coefficient X, the thickness Z1 of the moisture-sensitive material H prior to humidity rise, and the radius r of the hollow pipe P. Accordingly, the amount by which the frequency of the scattered light shifts in response to the rise in humidity Y can be computed using Equation (2) below, wherein a shift in frequency of scattered light with respect to the proportional strain is denoted P (MHz/με).

$$P\varepsilon = P\left\{\frac{r+Z1(1+X*Y)}{r+Z1}\right\} \quad (2)$$

Namely, since the sensitivity of the optical fiber sensor can be raised by increasing the value of strain in the optical fiber 210 for the same rise in humidity, the thickness Z1 of the moisture-sensitive material is set thicker at a location where there is a long distance from the optical fiber sensor device 10 than the thickness Z1 of the moisture-sensitive material at a location where there is a short distance therefrom.

Although explanation has been given regarding a method for computing the thickness of the moisture-sensitive material, this is merely an example thereof. The method for computing the required compensated amount, namely the volume of the moisture-sensitive material H, will vary depending on the type and shape etc. of the moisture-sensitive material H. Moreover, the method for computing the required compensated amount will also vary depending on circumstances at the respective measurement locations 220 and on the method employed to install the optical fiber 210 and the like.

This functionality enables the reception sensitivities at the plural measurement locations to be adjusted so as to be substantially the same as each other.

3. HARDWARE CONFIGURATION EXAMPLE

Explanation follows regarding an example of a hardware configuration of the optical fiber sensor device 10 according to an exemplary embodiment of the present invention. FIG. 7 is a block diagram illustrating an example of hardware configurations for configurations according to an exemplary embodiment of the present disclosure. Refer now to FIG. 7. The optical fiber sensor device 10 includes, for example, a CPU 371, ROM 372, RAM 373, a host bus 374, a bridge 375, an external bus 376, an interface 377, an input section 378, an output section 379, a storage section 380, a drive 381, a connection port 382, and a communication section 383. The hardware configuration illustrated is an example, and some configuration elements may be omitted therefrom. Alternatively, configuration elements other than those illustrated may also be included in addition thereto.

CPU 371

The CPU 371 functions as, for example, a computation processing device or a control device, and controls all or some of the operation of the respective configuration elements based on various programs recorded in the ROM 372, the RAM 373, the storage section 380, or a removable recording medium 501.

ROM 372, RAM 373

The ROM 372 holds programs to be read by the CPU 371, and data and the like employed in computation. The RAM 373 temporarily or permanently holds programs to be read by the CPU 371, and various parameters and the like that are changed as appropriate during execution of these programs.

Host Bus 374, Bridge 375, External Bus 376, Interface 377

The CPU 371, the ROM 372, and the RAM 373 are, for example, connected together through the host bus 374 having high speed data transmission capabilities. The host bus 374 is, for example, connected across the bridge 375 to the external bus 376 having a comparatively slow data transmission speed. The external bus 376 is connected to the various configuration elements through the interface 377.

Input Section 378

A mouse, keyboard, touch panel, button, switch, microphone, lever, or the like is, for example, employed as the input section 378. A remote controller capable of transmitting control signals using infrared or another form of electromagnetic waves may be employed as the input section 378.

Output Section 379

The output section 379 is a device capable of visually or audibly notifying a user of acquired information, and is for example a display device (display unit) such as a cathode ray tube (CRT), an LCD, an organic EL display, or the like, an audio output device such as a speaker, headphone, or the like, a printer, a mobile telephone, or a fax machine.

Storage Section 380

The storage section 380 is a device used to hold various data. The storage section 380 employs, for example, a magnetic storage device such as a hard disk drive (HDD), a semiconductor storage device, an optical storage device, or a magneto-optical storage device.

Drive 381

The drive 381 is a device that reads information recorded on the removable recording medium 501, for example a magnetic disk, optical disk, magneto-optical disk, semiconductor memory, or the like, and writes information to the removable recording medium 501.

Removable Recording Medium 501

Examples of the removable recording medium 501 include DVD media, Blu-ray (registered trademark) media, HD-DVD media, and various semiconductor storage media. The removable recording medium 501 may obviously also be configured by an IC card containing a contactless IC chip, an electronic device, or the like.

Connection Port 382

The connection port 382 is a port used to connect an externally connected device 502, for example a universal serial bus (USB) port, an IEEE 1394 port, a small computer system interface (SCSI), an RS-232C port, or an optical-audio terminal.

Externally Connected Device 502

The externally connected device 502 is, for example, a printer, a portable music player, a digital camera, a digital video camera, an IC recorder, or the like.

Communication Section 383

The communication section 383 is a communication device used to connect to a network 503. Examples of the communication section 383 include communication cards for a wired or wireless LAN, Bluetooth (registered trademark), or a wireless USB (WUSB), an optical communication router, an asymmetric digital subscriber line (ADSL) router, or a modem for various communications. The communication section 883 may also connect to a telephone network such as an internal telephone network or a mobile telephone operator network.

4. CONCLUSION

As described above, the present disclosure enables the provision of a novel and improved optical fiber sensor device and optical fiber sensor system capable of making the reception sensitivities substantially the same for plural measurement locations, thereby facilitating comparison of measurement results between the plural measurement locations.

Although detailed explanation has been given regarding preferable exemplary embodiments of the present disclosure with reference to the appended drawings, the present disclosure is not limited to these examples. It would be obvious to a person of ordinary skill in the technical field of this disclosure that various modifications and amendments could be arrived at within the range of the technical concept recited in the scope of claims, and it should be understood that such modifications and amendments would obviously also fall within the technical scope of the present disclosure.

What is claimed is:

1. An optical fiber sensor device for an optical fiber having a plurality of measurement locations set thereto, the optical fiber being so installed as to have a measurement segment thereof at each of the measurement locations, the measurement segments being of different lengths, and, between any two of the plurality of measurement locations, the one that is closer to the optical fiber sensor device having a shorter measurement segment, the optical fiber sensor device comprising:
   a light source that generates input light for inputting to the optical fiber;
   a light receiving device configured to receive scattered light backscattered by the optical fiber; and
   a processor configured
      to compute, for each of the measurement locations, a plurality of values of a physical quantity of the optical fiber, each value based on an intensity of scattered light, received by the light receiving device, from the measurement segment at said each measurement location, and
      to obtain, for each of the measurement locations, a physical quantity value for said each measurement location by averaging the computed physical quantity values of the optical fiber over the measurement segment at said each measurement location.

2. The optical fiber sensor device of claim 1, wherein the processor is configured to compensate for differences in the lengths of the measurement segments of the optical fiber installed at the different measurement locations by averaging, for each of measurement locations, the computed physical quantity values over the measurement segment thereof.

3. The optical fiber sensor device of claim 2, wherein the processor is configured to convert each of the physical quantity values that are the measurement segments of different lengths, to another physical quantity value that is for a same unit length.

4. The optical fiber sensor device of claim 3, wherein:
   the optical fiber is installed so as to link the plurality of measurement locations in a row, the optical fiber including a plurality of link segments that each links two of the measurement segments at adjacent two of the plurality of measurement locations; and
   the processor is configured to average the computed physical quantity values at the plurality of link segments of the optical fiber.

5. The optical fiber sensor device of claim 3, wherein the processor employs Brillouin optical time domain reflectometry (BOTDR) to compute the physical quantity of the optical fiber.

6. The optical fiber sensor device of claim 2, wherein:
   the optical fiber is installed so as to link the plurality of measurement locations in a row, the optical fiber including a plurality of link segments that each links two of the measurement segments at adjacent two of the plurality of measurement locations; and
   the processor is configured to average the computed physical quantity values at the plurality of link segments of the optical fiber.

7. The optical fiber sensor device of claim 2, wherein the processor employs Brillouin optical time domain reflectometry (BOTDR) to compute the physical quantity of the optical fiber.

8. The optical fiber sensor device of claim 1, wherein:
   the optical fiber is installed so as to link the plurality of measurement locations in a row, the optical fiber including a plurality of link segments that each links two of the measurement segments at adjacent two of the plurality of measurement locations; and
   the processor is configured to average the computed physical quantity values at the plurality of link segments of the optical fiber.

9. The optical fiber sensor device of claim 1, wherein the processor employs Brillouin optical time domain reflectometry (BOTDR) to compute the physical quantity of the optical fiber.

10. An optical fiber sensor system comprising:
   a light source that generates input light;
   an optical fiber configured to receive the input light and scatter the input light to generate scattered light, the optical fiber having a plurality of measurement locations set thereto, and being so installed as to have a measurement segment thereof at each of the measurement locations;
   a light receiving device configured to receive and measure intensity of the scattered light; and a processor configured
- to compute, for each of the measurement locations, a plurality of values of a physical quantity of the optical fiber, each value based on the intensity of the scattered light, received by the light receiving device, from the measurement segment at said each measurement location, and
- to obtain, for each of the measurement locations, a physical quantity value for said each measurement location by averaging the computed physical quantity values of the optical fiber over the measurement segment at said each measurement location, wherein the measurement segments at the plurality of measurement locations are of different lengths, and between any two of the plurality of measurement locations, the one that is closer to the light source has a shorter measurement segment.

* * * * *